United States Patent [19]

Teraoka

[11] Patent Number: 4,590,818
[45] Date of Patent: May 27, 1986

[54] SPEED CHANGE GEAR SHIFT ROD

[75] Inventor: Masao Teraoka, Tochigi, Japan

[73] Assignee: Tochigifujisangyo Kabushikigaisha, Tochigi, Japan

[21] Appl. No.: 597,510

[22] Filed: Apr. 6, 1984

[30] Foreign Application Priority Data

Apr. 7, 1983 [JP] Japan .................. 58-50906

[51] Int. Cl.⁴ .............................. G05G 9/14
[52] U.S. Cl. .................. 74/473 R; 92/85 B; 184/5; 188/284; 192/109 D
[58] Field of Search ........... 74/473 R; 184/5; 188/284; 91/394; 92/85 B; 192/109 D

[56] References Cited

U.S. PATENT DOCUMENTS

| 404,012 | 5/1889 | Nickerson | 192/109 D |
| 406,621 | 7/1889 | Blount | 192/109 D |
| 845,827 | 3/1907 | Steedman | 92/85 B |

OTHER PUBLICATIONS

Automobile Engineering Completion (Tokyo) vol. 9, Nov. 1980, pp. 77-80.

*Primary Examiner*—Allan D. Herrmann
*Attorney, Agent, or Firm*—Aaron B. Karas

[57] ABSTRACT

A speed change gear shift rod with cushioning function which is performed when the speed change gear is being operated is shown. The shift rod is supported in a freely slideable manner in the direction of the shaft, within a blind supporting hole provided inside a main case. An oil containment section is provided at the back of the supporting hole, formed between the end surface of the shaft end section and the back surface of the supporting hole during a speed change operation, when the shaft end section slides to the back of the supporting hole. An oil channel is also provided in the shaft end section or in the supporting hole, making it possible to divert oil from the inside to the outside of the previously mentioned shaft end section.

2 Claims, 6 Drawing Figures

SPEECH CHANGE GEAR SHIFT ROD

BACKGROUND OF THE INVENTION

1. Field of the Invention

This invention relates to a speed change gear shift rod.

2. Description of the Prior Art

Conventional speed change gear shift rods usually take the form of the unit illustrated in FIG. 1. That is, a shaft end section 105a of shift rod 105 is supported so that it is freely slideable in the direction of the shaft in a blind supporting hole 103 provided in a main casing 101. A slotted oil channel 107 is formed by the shaft end section 105a in the supporting hole 103, to divert oil from the inside to the outside of the supporting hole 103 when said shaft end section 105a slides toward the back of the supporting hole 103 as a result of the speed change action. Furthermore, a shift fork, which is not illustrated in the figure, is fixed on the shift rod 105, and this shift fork is connected both to a sleeve and to an action lever, neither of which is shown in the figure. Accordingly, when the shift fork is moved by means of the action lever, the sleeve is made to move by means of the shift rod, and the speed change of the speed shift gear is carried out. At that time, both the shift fork and the shift rod 105 move in the direction of the shaft, and an end surface 105b of the shaft end section 105a touches a back surface 103a of the supporting hole 103, and determines the position of the shift rod 105 and the shift fork. In addition, the lubricating oil which is thrown upward from the rotation of the gear and the like, enters the supporting hole 103, but this lubricating oil is expelled from an oil channel 107 when the shaft end section 105a slides to the back side of the supporting hole 103, and the sliding action of the shift rod 105 is not impeded.

However, with this type of conventional construction, the end surface 105b of the shift rod 105 impacts against the back surface 103a of the supporting hole 103 bacause of the speed changing action, and, as a result of this impacting, a percussive opposing force acts against the shift lever and becomes a hindrance to the operating feel of the shift lever. In addition, after the operation, the end surface 105b remains touching the back surface 103a of the supporting hole 103, and, because of this, an allophone is developed at the gap between the end surface 105b and the back surface 103a because of vibration, and this vibration is input directly from the back surface 103a of the supporting hole 103 in the shaft direction along the shaft end section 105a, causing the fear that a gear disengagement could occur.

To counteract this, a suitable flange section or difference in level is provided on top of the shift rod 105 in the neighborhood of the mouth of the supporting hole 103, and an elastic body is used as to link the space between this flange section or difference in level and the circumference of the rim of the mouth of the supporting hole 103, intended to act as a cushion during operation. However, in this case, even the provision of a flange section and the like on the shift rod 105 causes problems such as increase in weight and complication of the construction.

SUMMARY OF THE INVENTION

The present invention was developed giving due consideration to the abovementioned problems, with the main object of providing a shift rod for a speed change gear which is simply constructed, without incurring any increase in weight, and which will perform the cushioning function when the speed change gear is being operated.

In order to achieve these objectives, the present invention is constructed as a speed change gear shift rod which is supported in a freely slideable manner, in the direction of the shaft, within a blind supporting hole provided inside a main case, with the special feature of being provided with an oil containment section at the back of the said supporting hole, formed between the end surface of the shaft end section and the back surface of the supporting hole, by means of a speed change operation, when the shaft end section slides to the back of the supporting hole, and provided with an oil channel either in the abovementioned shaft end section or in the supporting hole, making it possible to divert oil from the inside to the outside of the previously mentioned shaft end section.

Other objects and further scope of applicability of the present invention will become apparent from the detailed description given hereunder. It should be understood, however, that the detailed description of specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given below, and the accompanying drawings which are given by way of illustration only, and thus are not limitative of the present invention and wherein.

DESCRIPTION OF THE PREFERRED EMBODIMENT

Figure 2:
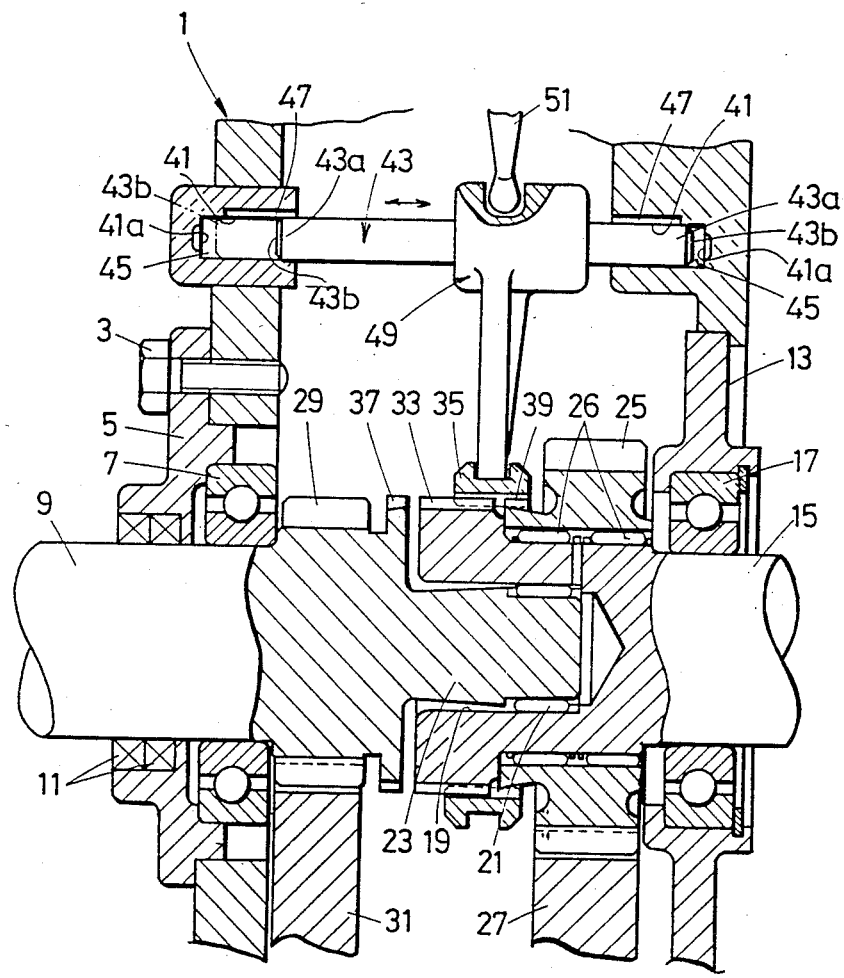
FIG. 2 is a longitudinal section view, with certain parts omitted, of one embodiment of the speed change gear according to the present invention.

FIG. 2 shows a longitudinal section view, with certain parts omitted, of a speed change gear which performs the high to low changeover for a four-wheel drive vehicle. A cover 5 is secured by means of a bolt 3 to a main casing 1, and a freely rotatable input shaft 9 is supported by means of a bearing 7 which mates with the inner section of the cover 5, while an oil seal 11 is provided within the bore of the cover 5. An output shaft 15 is supported in a freely rotatable manner on a bridge-wall 13, which is provided in the inner section of the main casing 1, through the medium of a bearing 17. On the end section of the output shaft 15, a shaft hole 19 opens in the direction of the shaft, and in the shaft hole 19, a shaft member 23, which protrudes into the end surface of the input shaft 9, is supported in a freely rotatable manner through the medium of a bearing 21. A gear 25 mates in a freely rotatable manner with the outer circumference of the output shaft 15, through the medium of a bearing 26, and is engaged with an intermediate gear 27 for changing the speed. In addition, a gear 29 is integrally formed with the gear 9, and engages with an intermediate gear 31 which changes the speed. A spline section 33 is provided on the circumference of the inner end of the output shaft 15, and engages a sleeve 35 which mates with that circumference in a freely slideable manner. On the input shaft 9 and on the gear 25, the spline section 33 and some spline sections 37 and 39, of the same shape as the spline section 33, are provided on both sides of the spline section 33, separated by suitable gaps.

Figure 1:
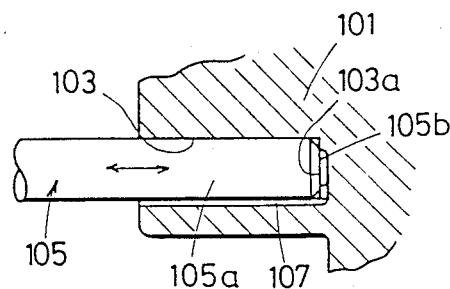
FIG. 1 is an enlarged section view showing the supported status of the conventional shaft end section of the shift rod.
Figure 3:
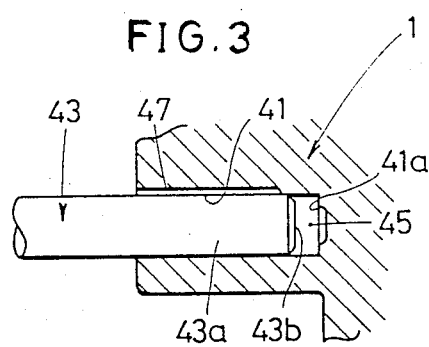
FIG. 3 is an enlarged section view showing the supported status of the shaft end section of the shift rod of the embodiment of the present invention shown in FIG. 2.
Figure 4:
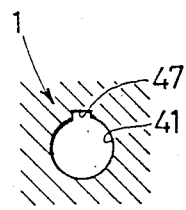
FIG. 4 is a section view of the support hole of the same embodiment of the present invention.

A blind supporting hole 41 is provided within the main casing 1. An end section 43a of a shift rod 43 is supported in the supporting hole 41 so that it is freely slideable in the direction of the shaft, and the end section 43a of the shift rod 43, in the back side of the supporting hole 41, forms an oil containment section 45 in the space between an end surface 43b of the end section 43a and a back surface 41a of the supporting hole 41, when the shift rod 43 slides toward the back end of the supporting hole 41, said oil containment section 45 being formed in the manner illustrated in FIG. 3 (refer to the left side of the supporting hole 41 in FIG. 2). In addition, a grooved oil channel 47, extending from the mouth of the supporting hole 41 to the neighborhood of the oil containment section 45, is formed as shown in FIG. 3 and FIG. 4. When the shaft end section 43a of the shift rod 43 has slid to the back side of the supporting hole 41, the oil channel 47 acts as a guide by discharging the oil from the inside to the outside of the supporting hole 41.

A shift fork 49 is secured to the shift rod 43, and the bottom end of the shift fork 49 is connected to the sleeve 35. In addition, a shift lever 51, supported by the main casing 1, is connected to the shift fork 49. Furthermore, although not shown in the drawings, lubricating oil is stored in the bottom section of the inside of the main casing 1.

Next, the operation of this embodiment of the present invention is explained.

Under the conditions shown in FIG. 2, the output shaft 15 is connected to the gear 25, through the medium of the sleeve 35 and the spline sections 33 and 39, and power is transmitted from the input shaft 9 to the output shaft 15, through the medium of the gear 29, the intermediate gears 31 and 27, and the gear 25, and the output shaft 15 rotates at the specified comparative speed change. The lubricating oil which is thrown up as a result of the rotation of the intermediate gears 27 and 31 enters the supporting hole 41 at the left hand side of FIG. 2, through the medium of the oil channel 47.

The shift lever 51 is manipulated, and the sleeve 35 is made to engage in the direction of the spline section 37, with the shift fork 49 being moved to the position indicated at the left hand side of FIG. 2, upon which the shift rod 43 also moves in the same direction. Through this motion of the shift rod 49, the shaft end section 43a on the left hand side of FIG. 2 slides to the back side of the supporting hole 41 on the same side. The extra lubricating oil in the supporting hole 41 is directed to the oil channel 47 by the sliding action of the shaft end section 43a, and is discharged to the outside of the supporting hole 41. When the shaft end section 43a blocks the oil channel 47 with its outer circumferential surface, the left side of the supporting hole 41 in FIG. 2 and the shaft end section 43a assume the condition indicated on the right side of the same drawing. The oil containment section 45 is formed in the back section of the supporting hole 41, between the end surface 43b of the shaft end section 43a and the back surface 41a of the shaft end section 43a and the back surface 41a of the supporting hole 41, as shown in FIG. 3. Accordingly, the shaft end section 43a, while being subjected to cushioning, has its position determined at that point, according to the pressure of the lubricating oil. For this reason, any percussive opposing force operating against the shaft lever 51 disappears, and any loss of operating feel at the shift lever disappears. In addition, because the end surface 43b does not make direct contact with the back surface 41a of the supporting hole 41, such phenomena as the development of an allophone along with vibrations, and the input of vibrations from the back surface 41a of the supporting hole 41 in the direction of the shaft to the shaft end section 43a, disappear, and it is possible to prevent a disengagement of the gears.

Figure 5:
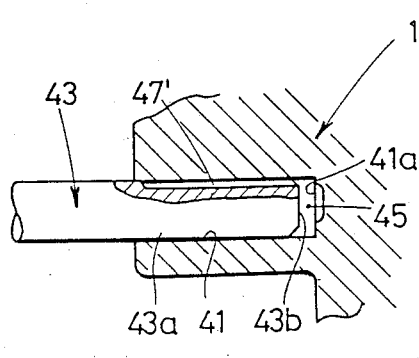
FIG. 5 is an enlarged section view showing the supported status of the shaft end section of a shift rod relating to another embodiment of the present invention.
Figure 6:
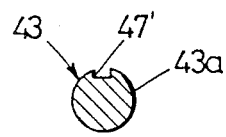
FIG. 6 is a sectional drawing of the shaft end section of FIG. 5.

FIG. 5 and FIG. 6 illustrate another embodiment of the present invention. In this embodiment the oil channel 47' is provided in the shaft end section 43a. The structural parts bear the same symbols as the previously outlined embodiment, therefore an explanation is omitted.

Furthermore, the present invention is not restricted to the abovementioned embodiments. For example, it is possible for this present invention to take the form in which the oil channel 47 is in the center section of the shaft of the shift rod, or penetrates the circumference of the supporting hole 41.

To further clarify the above explanation, in accordance with the construction of the present invention, because cushioning is performed when the position of the shift rod is determined by means of the lubricating oil contained in the oil containment section, any percussive opposing force operating against the shift lever disappears, and there is no loss of operating feel. The end surface of the shaft end section of the shift rod, through the medium of the lubricating oil, is in opposition to the back surface of the supporting hole, and, for this reason, it is possible to prevent the creation of an allophone caused by vibration, and to prevent gear disengagement. Furthermore, because the construction is simple, requiring only that an oil channel be provided, it is possible to obtain a weight reduction in the structure.

Furthermore, the invention being thus described, it will be obvious that the same may be varied in many ways. Such variations are not to be regarded as a departure from the spirit and scope of the invention, and all such modifications are intended to be included within the scope of the following claims.

What is claimed is:

1. A speed change gear shift rod having an end section located within a blind supporting hole formed in the casing of a gear change box and being slideable within said blind supporting hole along its longitudinal axis, the improvement comprising an oil containment section being confined by at least an end surface of said shift rod and a ring-like inner wall at the bottom end of said blind supporting hole and the back surface of said blind supporting hole so that both surfaces are separated from each other by the sliding of said shift rod, said oil containment section being formed on a periphery of said end section of said shift rod as a groove extending along the longitudinal axis of said shift rod to the end thereof.

2. A speed change gear shift rod as claimed in claim 1 further comprising an oil channel formed on said end section of said shift rod to divert oil from the inside of said blind supporting hole to the exterior of said blind supporting hole, said oil channel having a length shorter than that of said blind supporting hole and opening to said oil containment section at an outer end of said shift rod.

* * * * *